United States Patent [19]

Lucht

[11] Patent Number: 5,832,198
[45] Date of Patent: Nov. 3, 1998

[54] MULTIPLE DISK DRIVE ARRAY WITH PLURAL PARITY GROUPS

[75] Inventor: Philip H. Lucht, Salt Lake City, Utah

[73] Assignee: Philips Electronics North America Corporation, New York, N.Y.

[21] Appl. No.: 612,157

[22] Filed: Mar. 7, 1996

[51] Int. Cl.[6] .................................................. G06F 11/10
[52] U.S. Cl. ............................... 395/182.04; 395/182.05
[58] Field of Search ........................ 395/182.04, 182.02, 395/200.15, 200.02, 200.12, 200.01, 200.09, 182.05

[56] References Cited

U.S. PATENT DOCUMENTS

| 5,163,131 | 11/1992 | Row et al. ........................... 395/200.09 |
| 5,265,098 | 11/1993 | Mattson et al. ..................... 395/182.04 |
| 5,278,838 | 1/1994 | Ng et al. ............................. 395/182.04 |
| 5,355,453 | 10/1994 | Row et al. ........................... 395/200.01 |
| 5,412,661 | 5/1995 | Hao et al. ........................... 395/182.04 |
| 5,539,660 | 7/1996 | Blair et al. .......................... 364/514 C |
| 5,590,381 | 12/1996 | Mourad ................................ 395/872 |
| 5,592,612 | 1/1997 | Birk .................................... 395/182.04 |

FOREIGN PATENT DOCUMENTS

0521630 A2  1/1993  European Pat. Off. .
7-07425    4/1995  Japan .

*Primary Examiner*—Ly Hua
*Attorney, Agent, or Firm*—Michael E. Belk

[57] ABSTRACT

A plurality of disk drive memories are operatively coupled to a plurality of disk drive controllers. The disk drives are operatively grouped and coupled to a plurality of communication busses, each bus being coupled to a respective disk drive controller. A plurality of segment buffers are coupled to the disk drive controllers and a parity error correction system is coupled to the segment buffers. The error correction system is coupled to an input/output circuit through a plurality of buffers and an interface circuit. A processor communicates with the output buffers, the error correction system, and the segment buffers to control the storage and retrieval of data to and from the array of disk drives. The error correction system establishes a plurality of relatively small parity groups among the disk drives, each parity group having a designated parity drive. The number of drives within each parity group is maintained at a substantially reduced number to provide high speed system response to user inputs and changes and to improve system reliability. Data is uniformly distributed among the parity groups and the disk drives therein.

25 Claims, 2 Drawing Sheets

MULTIPLE DISK DRIVE ARRAY WITH PLURAL PARITY GROUPS

CROSS-REFERENCE TO RELATED PATENT APPLICATION

This application discloses apparatus described and claimed in pending patent application Ser. No. 08/125,996 filed Sep. 23, 1993 and entitled Multi-Channel Common-Pool Distributed Data Storage and Retrieval System which is assigned to the assignee of the present application and which is hereby incorporated herein by reference.

BACKGROUND OF THE INVENTION

1. Field of the Invention

This invention relates generally to multi-user information systems and particularly to systems having mass information storage media formed of one or more arrays of individual memory units such as disk drives which service real time applications such as video on demand.

2. Description of the Related Art

The rapid advances in information system technologies have facilitated great improvement in the distribution of information and entertainment material. Such distribution has been aided by the development and rapid increase of information networks such as those provided by cable television systems or the like. One of the most promising information system developments in the entertainment industry is the availability of so-called "video on demand" for television viewers. The basic concept of video on demand is relatively simple and clearly attractive to consumers. The basic idea of video on demand provides that individual consumers or viewers are able to independently access the stored data source of a plurality of stored entertainment programs such as movies or the like. This independent access frees the individual consumers from the restrictive nature of scheduled network distribution of present day cable systems. Thus, the viewer in a video on demand system is able to simply "dial up" the media storage and distribution facility through the cable network and view the desired program at any time.

While the basic concept of video on demand is simple, its implementation in a practical environment is extremely difficult and complex. In essence, the system must be capable of providing each viewer with independent access to the stored entertainment material. In a typical cable system environment, thousands and perhaps tens of thousands of viewers are serviced. To provide each with independent access to the plurality of program materials within the massive media inventory is a daunting task. To further exacerbate the problem, the nature of entertainment material, namely video and audio information, represents a large amount of information to be communicated. Thus, an effective video on demand system requires that an immense quantity of program information be stored within the mass media and a great number of subscribers be able to access the stored mass media simultaneously or nearly simultaneously.

The need for high volume, high speed access to large media storage systems is not unique to video on demand operations. In related uses of such information systems such as interactive video, the rapid storage and retrieval of data and/or information from the mass media is necessary. Still other information systems such as those used for film and television industry special effects and related operations such as image compositing, editing, or post production require high speed access to large amounts of stored information. Powerful computing systems also require high speed access to large data storage systems. Video on demand systems and video servers operate in a substantially more demanding environment, however, in that they must provide access to a large number of viewers or users. In addition, this access must be rapid approaching real-time access and data flow. Unlike computer systems which are able to wait for data, video on demand and video servers "crash" if data is not timely available.

In attempting to provide the necessary information storage and retrieval of information at high speed to multiple users, practitioners in the video server arts have resorted to ever faster processors and parallel processing with somewhat limited success. A particularly successful system is shown in the above-referenced co-pending patent application which sets forth a novel high speed system for meeting the demanding needs of such systems.

While the systems provided by practitioners in the art in attempting to meet the needs of high speed multiple access mass information storage has been subject to considerable variation, most, if not all, utilize one or more randomly accessible memory devices such as disk drive memories. Disk drives are highly effective in such applications due to the speed with which they operate and substantial storage capacity which they exhibit. Thus, disk drives provide random access, substantial capacity and relatively rapid storage or retrieval of information. Typically, to provide greater memory, disk drives are arranged in large arrays which operate under the coordination and interface of one or more so-called disk controllers. The problem of providing rapid access to a large number of viewers nonetheless remains unsolved however.

System response speed to multiple user requests is determined, in part, by the speed with which the system disk drives operate. Basically, to retrieve data, the disk drive must first locate it. Thus, a time interval is required for the disk drive head to locate the particular portion of the disk upon which data is stored. This process essentially involves moving the disk drive head to the appropriate disk radius (usually called "seek") and thereafter rotating the disk until the desired disk portion is proximate to the drive head (usually called "latency"). The actual time of this interval is a characteristic of the particular disk drive fabrication and varies between disk drive designs. However, all disk drives exhibit a data location time interval characteristic.

In a user accessible system, such as video on demand or the like, the disk array must be accessible by multiple viewers in an asynchronous operation. That is to say, different viewers need to access the system in unrelated time intervals. While some viewers may be able to access the disk array quickly with little apparent delay, the more likely situation is delayed access as the system processes earlier requests. In essence, the first requesting viewer (best case) does not wait and the last requesting viewer (worst case) is delayed until all other viewer requests are processed. If the minimum data location time interval for a given disk drive is represented by the term Td and the total number of viewers seeking access is represented by Nv, service time or response time of the array (Tserv) becomes Td in the best case and (Td×Nv) in the worst case. As a result, such multiple disk drive systems servicing multiple users exhibit an overall average system response time for each user or viewer (Tserv) which is approximately one-half the product of (Td×Nv).

In other words, the response time of the disk drive array to most viewer requests is directly proportional to the number of viewers and disk data location time.

Another limitation in the use of large arrays of disk drives arises from the failure rate which the drives themselves exhibit. In multiple disk drive systems, an increased number of drives also means an increased number of drive failures reducing system operating time between failures. Thus, on the one hand, memory capacity may be increased by adding additional disk drives to the array. While, on the other hand, overall system reliability is correspondingly reduced by increased likelihood of a drive failure.

To meet the problem of disk drive failure, practitioners employ parity error correction systems known generally as "parity systems". In a parity system, an additional disk drive, usually referred to as the parity drive, is added to the disk drives in the array. The combination of active drives and the parity drive is referred to as a parity group. Within the parity group, a parity error correction system performs a computation upon the data or information prior to storage upon the disk drives and calculates parity data which is stored within the parity drive. The function of the parity data is to provide the required information which the error correction system may use upon the failure of a disk drive within the active disk drives in the array to reconstruct the lost data and thereby enable the system to continue functioning. In essence, the parity drive data together with the information stored on the remaining operating drives (active drives) facilitates the calculation of the information and data stored on the failed drive. As a result, the operation of the disk drives in the parity group array is able to continue despite the failure of one disk drive. Upon the failure of a second drive, however, the disk array is unable to function. Because the likelihood of a disk drive failure increases directly with the number of drives in the disk array, the reliability of the system is correspondingly reduced as the number of drives in the array increases.

In a typical video server system, the disk array is organized into a single parity group having a single parity drive. The use of a single parity group allows the video information to be distributed throughout the entire array. This is generally believed to maximize the storage capacity of the system since a single drive provides parity protection while the remaining drives actively store video data and related data. Because the highest operating priority of video servers is the timely assembly of each video field, data is usually distributed across the disk array rather than concentrated on a portion of the disk array. This distribution minimizes the likelihood of delay in retrieving data since retrieval moves across the array and is not focused on any one disk drive for an extended time interval. Unlike computing systems, in which the user is accustomed to waiting, users of video servers must see a seemingly continuous display of video fields.

In certain computer systems, the disk drive array is divided into a plurality of parity groups rather than formed into a single parity group. This improves the reliability of the system at the expense of more parity drives. In such a system, however, due to the random location of data storage on the parity groups, there is possible a degradation of response time arising for example when the processor requires repeated accesses to data in the same parity group. In most computing operations, however, this delay in retrieving data may be tolerated as the price for increased overall system reliability. In essence, the computer system simply "waits" and the user at the worst observes longer processing times.

A variation of the above-described basic parity error correction system is set forth in US Pat. No. 5,163,131 issued to Row, et al. entitled PARALLEL I/O NETWORK FILE SERVER ARCHITECTURE. In pertinent part therein, there is described a group of thirty SCSI disk drives supported by a plurality of storage processors. The group of disk drives are visible to a client processor either as three large logical disks or as thirty independent SCSI drives. When the drives are visible as three logical disks, the storage processor uses RAID 5 (redundant array of inexpensive drives, revision five) algorithms to distribute data for each logical drive on nine physical drives. The tenth drive is a spare. Data is divided into stripes which are recorded sequentially on eight different drives. A ninth parity stripe is created by an exclusive OR process of the eight data stripes to form a parity stripe stored on the ninth drive. The parity stripes are rotated among the nine drives to avoid drive contention during write operations.

While the use of faster controllers and processors together with parity error correction have provided operative computer systems able to exhibit commercial viability, such systems are not effective in a video server system. There remains nonetheless a continuing need in the art for ever-more improved efficient, effective and reliable information storage and retrieval systems capable of independent access, high speed storage and retrieval, and large capacity. In particular, there remains a continuing need in the art for disk drive array systems which facilitate the use of drive arrays having a large number of disk drives without the problems of reduced system reliability and longer response times to viewer inputs and demands.

SUMMARY OF THE INVENTION

Accordingly, it is a general object of the present invention to provide an improved multiple disk drive array system having increased reliability. It is a more particular object of the present invention to provide an improved more reliable multiple disk drive memory array having reduced response time for user access.

In accordance with the present invention, it has been found that the system response time to user inputs and demands may be improved (made shorter) by dividing the disk drive array into a plurality of disk drive groups. It has also been found that providing a dedicated parity drive for each disk drive group maintains the benefits of parity protection for the array while improving the system reliability.

The present invention provides a multiple disk drive array for use in storing and/or retrieving data within a multi-user information system in a generally uniform distribution. In one embodiment, the multiple disk drive array comprises: (a) a plurality of disk drives; (b) error correction means for treating the disk drives as parity groups of disk drives within the plurality of disk drives, each of the parity groups having a disk drive designated as a parity drive; and (c) controller means for communicating data to and/or from the plurality of disk drives by distributing data to and/or receiving data from the parity groups in a substantially uniform distribution. In a further implementation of that embodiment, the parity groups are each formed of numbers of disk drives which are small relative to the total number of disk drives in the plurality of disk drives.

In another embodiment of the invention, the multiple disk drive array comprises: (a) a plurality of communication busses; (b) a plurality of disk drive groups, each of the disk drive groups having at least one disk drive coupled to one of the communication busses; (c) a plurality of disk controllers, each coupled to one of the communication busses for storing data on and/or retrieving data from the disk drives of disk drive groups in a substantially uniform distribution; and (d) error correction means for treating the disk drives as parity groups, each of the parity groups having a parity drive and at least one active disk drive.

In still another embodiment of the invention, the multiple disk drive array comprises a plurality of disk drives organized into a plurality of parity groups having data substantially uniformly distributed among the parity groups in which each parity group has plural active drives and a designated parity drive, and each parity group has its respective data stored in a substantially uniform distribution among its active disk drives. In that embodiment, the parity groups are formed of numbers of disk drives which are small relative to the total number of disk drives in the plurality of disk drives.

In one further embodiment of the invention for use in storing and/or retrieving data within a multi-user information system accessible to a plurality of users (Nv), the multiple disk drive array comprises a plurality of disk drives, in which each disk drive has a minimum data location time interval (Td), organized into a plurality of parity groups (G), with each parity group having a designated parity drive and the number of parity groups being selected to provide a system response time for user access (Tserv) in accordance with the following:

$$Tserv=(Nv \times Td)/G.$$

BRIEF DESCRIPTION OF THE DRAWINGS

The invention, together with further objects and advantages thereof, may best be understood by reference to the following description taken in conjunction with the accompanying drawings, in the several figures of which like reference numerals identify like elements and in which.

DESCRIPTION OF THE PREFERRED EMBODIMENT

Figure 1:
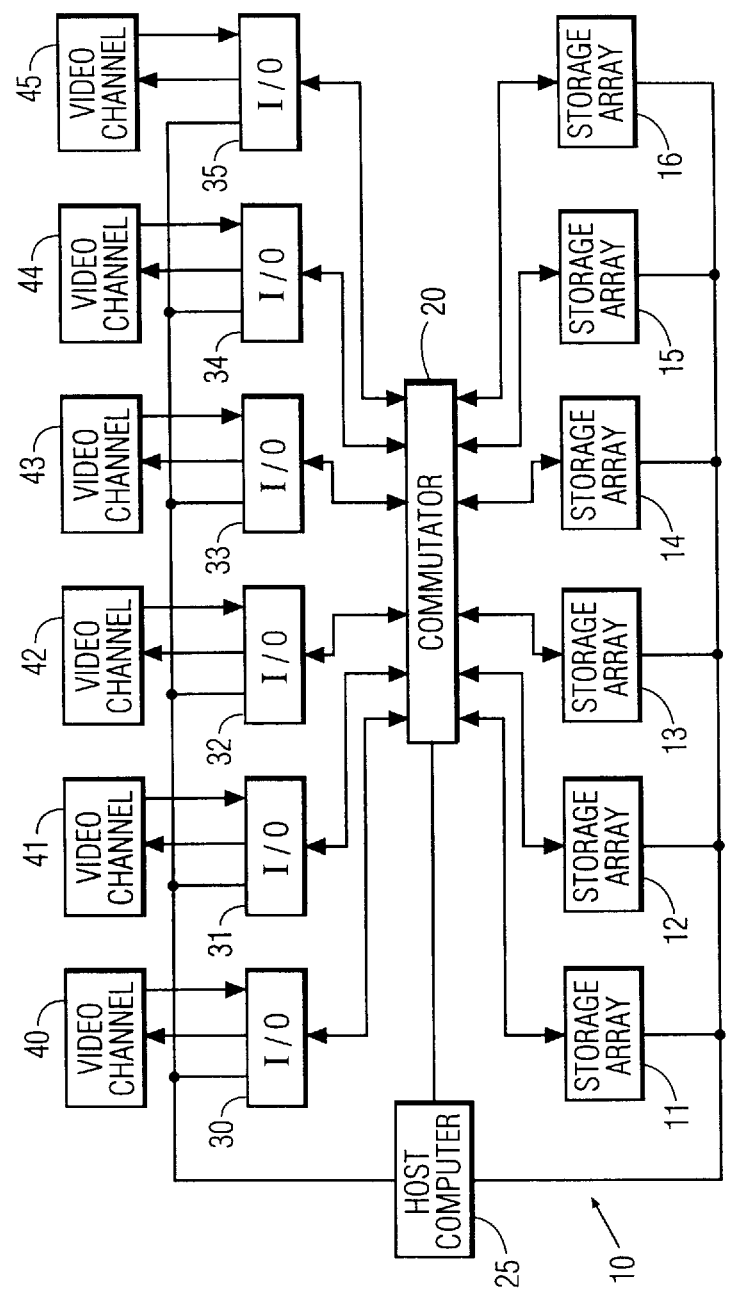
FIG. 1 sets forth a block diagram of a multi-channel common-pool distributed data storage and retrieval system having storage arrays constructed in accordance with the present invention.

FIG. 1 sets forth a data storage and retrieval system of the type set forth in the above-referenced pending patent application generally referenced by numeral 10. By way of overview, data storage and retrieval system 10 is operative utilizing a plurality of storage arrays 11 through 16 which may be constructed in accordance with the present invention set forth below in greater detail.

It should be noted that data storage and retrieval system 10 provides an exemplary operative embodiment for the present invention multiple disk drive array system used for storage arrays 11 through 16. However, it will be apparent to those skilled in the art from the descriptions which follow particularly in connection with FIG. 2 that the present invention is not limited to operation in systems such as data storage and retrieval system 10. On the contrary, the present invention may operate equally well in virtually any environment in which a plurality of disk drives or equivalent devices are arranged in an array to supply large capacity high speed data retrieval and storage and are required to provide rapid access to the array by a large number of users.

System 10 further includes a plurality of video channels 40 through 45 which are operatively coupled to a corresponding plurality of input/output devices 30 through 35. Video channels 40 through 45 may, for example, comprise a plurality of subscriber inputs to a video on demand system. Input/output devices 30 through 35 provide appropriate interface of video channels 40 through 45 and perform necessary functions such as conversion of information format between the frame organized data upon which video channels 40 through 45 operate and the generic computer data format upon which the remainder of system 10 operates. As is set forth in the above-referenced patent application, commutator 20 provides coupling between input/output devices 30 through 35 and storage arrays 11 through 16 in a multipath rotating/switching commutation which distributes data from/to each of input/output devices 30 through 35 to/from each of storage arrays 11 through 16. FIG. 1 further includes a host computer 25 which is operatively coupled to commutator 20 as well as the input/output devices and storage arrays to manage the system operation. As is also set forth in the above-referenced patent application, data is distributed to each of the storage arrays in a substantially uniform distribution rather than the generally random, or nonuniform distribution within a typical computer system. This uniform distribution together with the plural parity grouping of the drives yields a faster response to user access for any given number of users. As used herein, uniform distribution of data is any method of recording multiple streams of data on the parity groups such that when any combination of streams is played back to any number of users, all parity groups are kept busy all the time. Simply stated, none of the parity groups is idle.

Storage arrays 11 through 16 each include a plurality of disk drive memories operative under one or more disk controllers to provide high speed random access data storage and retrieval. In accordance with the present invention and as is set forth below in greater detail, the disk drive memories of storage arrays 11 through 16 are organized and operatively controlled to form a number of parity groups each having a parity drive and a small number of active disk drives. As is set forth below and in accordance with the present invention, this use of a disk drive array organized into a plurality of parity groups each having a number of active drives and a dedicated parity drive together with a generally uniform data distribution overcomes the prior art response speed limitations and reliability problems.

In essence, the present invention system reflects the discovery that the response speed of a multiple disk array to user inputs and demands is dramatically improved when the array is divided into a plurality of smaller groups. Thus, recalling the above equation which defines the worst case system response time for each user or viewer as:

$$Tserv = Nv \times Td$$

it has been noted that Tserv (time required for a user to gain access to the array) is directly related to Nv (the number of users accessing the drives in the array). It has also been noted that video servers or video on demand systems of the type to which the present invention relates, are extremely sensitive to viewer request access times.

For the present invention, however, Nv is replaced in the above equation by Neff, which is the effective number of viewers accessing the system drives. It has been found that Neff=Nv/G where G is the number of groups into which the array is divided. Thus, for example, in an array having one parity, the system response time (Tserv) is reduced from Nv×Td to (Nv×Td)/10 when the array is divided into ten parity groups. If twenty groups are formed, Tserv drops to (Nv×Td)/20 and so on.

To provide a corresponding improvement in system reliability, each group includes a dedicated parity drive. As a result, a single drive failure merely leaves that single group void of parity protection. All other groups remain parity protected.

Figure 2:
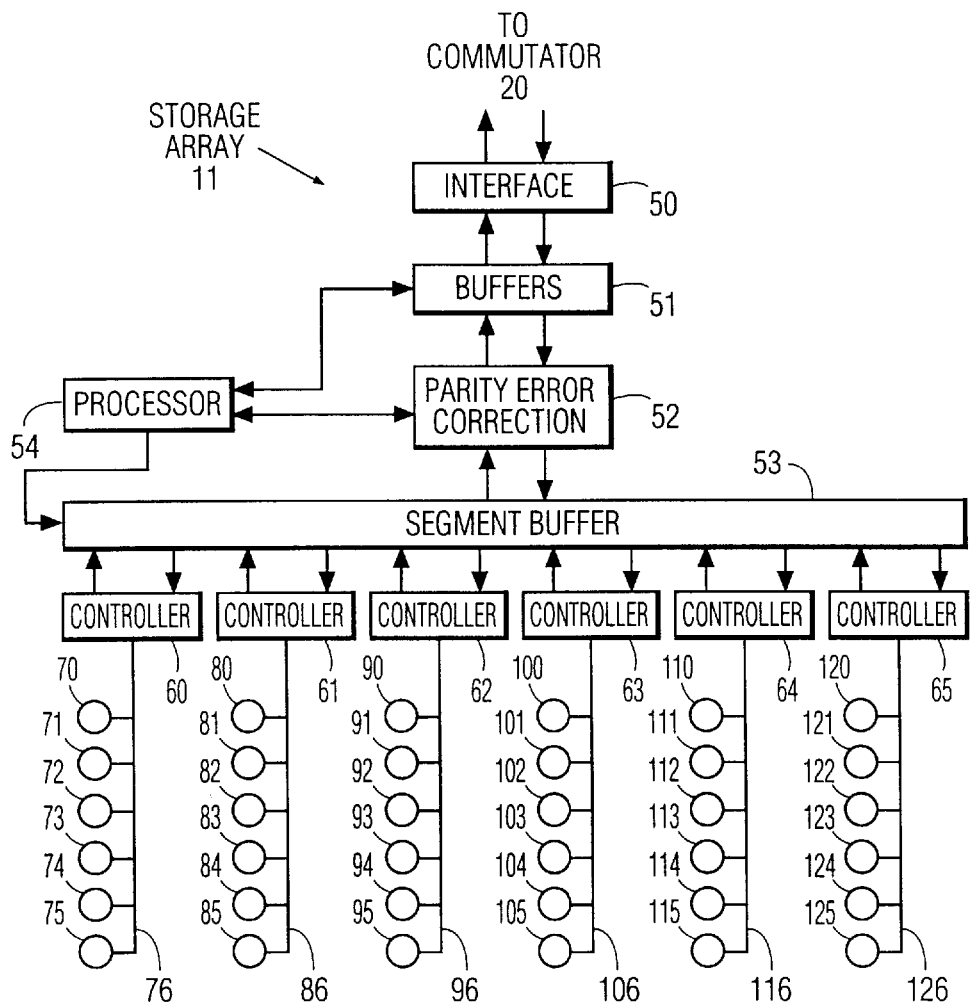
FIG. 2 sets forth a block diagram of a multiple disk drive array constructed in accordance with the present invention.

FIG. 2 sets forth a block diagram of storage array 11 in greater detail. Storage array 11 utilizes a plurality of disk drives 70 through 75, 80 through 85, 90 through 95, 100 through 105, 110 through 115, and 120 through 125 arranged to form six groups of disk drives each operatively coupled to a disk drive controller using a common bus coupling. More specifically, storage array 11 includes a discommunication bus 60 having a communication bus 76 which may, for example, comprise a communication bus of the type known generally as a Small Computer Standard Interface or "SCSI Bus". Disk drives 70 through 75 are operatively coupled to bus 76 and, as a result, are operatively coupled to disk controller 60. Correspondingly, controller 61 is operatively coupled to a communication bus 86 which in turn is operatively coupled to disk drives 80 through 85. In the same manner, disk controllers 62, 63, 64 and 65 are operatively coupled to communication busses 96, 106, 116 and 126 respectively. Disk drives 90 through 95 are operatively coupled to bus 96. Disk drives 100 through 105 are operatively coupled to communication bus 106 while disk drives 110 through 115 and disk drives 120 through 125 are operatively coupled to communication busses 116 and 126 respectively. Controllers 60 through 65 are operatively coupled to a plurality of segment buffers 53 which in turn are coupled to a parity-based error correction circuit 52.

A processor 54 is coupled to parity error correction circuit 52 and segments buffers 53 for controlling data transfer between segment buffers 53 and error correction circuit 52 in the manner described in the above-referenced copending related application. An array of buffers 51 operatively couple error correction system 52 to an interface 50. Interface 50 provides appropriate data formatting and transfer of data to and from buffers 51 to communicate data to and from storage array 11 to the operative environment of the system. In the example set forth in FIG. 1, interface 50 is operatively coupled to commutator 20. However, in the event storage array 11 is utilized in a different operative environment, it will be understood that interface 50 is appropriately configured for that environment and is coupled to the system input/output processing channel. Processor 54 is also coupled to buffer array 51 to control data transfer between buffer array 51 and error correction circuit 52 in accordance with system operation.

Storage array 11 is shown having six groups of disk drives each of which utilizes six disk drives. It will be understood by those skilled in the art that the number of controllers and disk drive groups as well as the number of disk drives within each group operating off a common controller is subject to variation to meet system needs and constraints.

In accordance with the present invention, the object is to provide a plurality of parity groups. Accordingly, the disk drives within storage array 11 are divided into a number of parity groups each of which includes a parity disk drive and a number of active disk drives. For example, error correction system 52 may set up parity relationships among the system drives in which disk drives 70 through 75 form a parity group having disk drive 75 operating as a parity drive. This provides a parity group size of six disk drives within which five disk drives are receiving and storing media data and a sixth disk drive is receiving and storing parity data. Similarly, error correction system 52 may establish parity groups for each of the disk drive groups coupled to controllers 61 through 65. For example, disk drives 80 through 85 may form a parity group in which disk drive 85 is the parity drive. Similarly, disk drives 90 through 95, 100 through 105, 110 through 115, and 120 through 125 may form parity groups of six drives each in which drives 95, 105, 115 and 125 respectively are designated as parity drives. When so configured, storage array 11 operates in accordance with the present invention to provide a substantially increased number of parity drives and parity groups each of which contains a number of active drives. Error correction system 52 provides the calculation of parity data for each parity group and applies the parity data to each parity drive. In accordance with a significant advantage of the present invention system described above, the use of a disk drive array divided into a plurality of comparatively small parity groups substantially decreases the overall system response time. Thus, it has been found beneficial to use parity group sizes within the range of five to ten disk drives and a total number of disk drives numbering between twenty and one hundred. However, it will be apparent to those skilled in the art that the invention may be practiced in arrays having different drive numbers.

In addition, the overall reliability of storage array 11 is improved substantially due to the increased availability of parity drives. Thus, in the event for example drive 70 fails, error correction system 52 operates in accordance with well known parity correction and computes the lost data stored on drive 70 using the data stored on drive 71 through 74 and parity drive 75 and reorganizes drives 71 through 75 such that drive 75 replaces disabled drive 70 and receives the data previously stored on drive 70. Thereafter, drives 71 through 75 function in the same manner under the control of controller 60 as previously provided by drives 70 through 74 maintaining system operation. The parity protection of the reorganized group formed by drives 71 through 75 is restored once drive 70 is restored or replaced. During the time required to restore or replace drive 70, drives 71 through 75 operate without parity protection. However, unlike prior art systems in which one drive failure leaves the entire system void of parity protection until the disable drive is replaced or repaired, the present invention system provides that the remainder of storage array 11 with the exception of drives 71 through 75 continues to be protected against further drive failure despite the use of parity drive 75 as an active drive. Thus, for example, if following the failure of drive 70 drives within one or more of the other parity groups fail, the operation of error correction system 52 is carried forward within each affected parity group to compensate for and replace the disabled drive. It will be apparent to those skilled in the art that storage array 11 is capable of continued operation despite the failure of one active disk drive within each of the parity groups established.

The example given above in which each parity group comprises the disk drives operatively coupled to each of controllers 60 through 65 is provided for illustration. However, the selection and formation of parity groups is not limited to any particular disk drive physical arrangement. For example, error correction system 52 may establish a parity group formed of disk drives 70, 80, 90, 100, 110 and 120 with any one of the group drives (such as drive 100) being designated as a parity drive. Correspondingly, additional parity groups may be formed from one disk drive from each of busses 76, 86, 96, 106, 116 and 126. For example, the second parity group may comprise disk drives 71, 81, 91, 101, 111 and 121 with the remaining groups being formed in a similar manner across the array. The important aspect with respect to the present invention is the provision of numerous parity groups, each having a small number of drives relative to the total array, to provide faster system response and greater reliability. By way of further illustration, error correction system 52 may form parity groups without regard to any particular arrangement within the array of disk drives. In addition, the system speed of response and reliability is capable of further increase by further decreasing the number of drives per parity group and increasing the number of parity groups within the array of disk drives. Thus, groups of five disk drives having four active drives and one dedicated parity drive provides still further improvement over the above described example of parity groups having six disk drives.

It will be apparent to those skilled in the art in view of the foregoing that the present invention system contravenes the prior art relating to video servers and the like which provides organization of disk arrays into a single parity group in which a single parity drive protects the entire group. In contrast, the present invention system results from the discovery that system speed of response to user inputs and demands is substantially improved by the organization of the disk drive array into a number of parity groups. Further, the present invention system provides substantially uniform distribution of data among the plural parity groups, and in addition among disk drives within each parity group substantially in the same manner as described in the above-referenced related application. The use of plural parity groups also results in reliability improvements.

While it has been found that the response speed of a given array size is improved by any division of the array into a plurality of groups rather than a single group, it has also been found that in systems such as video on demand servers using presently available disk drives, dividing the array to form parity groups having between five and ten disk drives each provides an optimum system performance and response time while maintaining overall system storage capacity at an acceptable level for any particular total number of disk drives within the array. Thus, what has been shown is an improved multiple disk drive array for use in a video server or the like having plural parity groups which provides high speed response to user inputs and changes as well as improved reliability.

While particular embodiments of the invention have been shown and described, it will be obvious to those skilled in the art that changes and modifications may be made without departing from the invention in its broader aspects.

That which is claimed is:

1. A multiple disk drive array for use in storing and/or retrieving data within a multi-user information system in a generally uniform distribution, the multiple disk drive array comprising:

a plurality of disk drives;

error correction means for treating the disk drives as a plurality of parity groups of disk drives within said plurality of disk drives, each of said parity groups having a disk drive designated as a parity drive; and controller means for communicating data to and/or from said plurality of disk drives by distributing data to and/or receiving data from said parity groups in a substantially uniform distribution.

2. The multiple disk drive array as set forth in claim 1 further including interface means, coupled to said error correction means for receiving data for storage within said disk drive array and/or for outputting data retrieved from said disk drive array.

3. The multiple disk drive array as set forth in claim 2 wherein said controller means includes:

a plurality of disk controllers, each coupled to said error correction means; and a plurality of communication busses, each coupled to one of said disk controllers and each coupled to one or more of said disk drives in said plurality of disk drives.

4. The multiple disk drive array as set forth in claim 3 further including a segment buffer array interposed between said plurality of disk controllers and said error correction means.

5. The multiple disk drive array as set forth in claim 4 further including a plurality of buffer circuits interposed between said error correction means and said interface means.

6. The multiple disk drive array as set forth in claim 5 further including a processor operatively coupled to said error correction means, said plurality of buffer circuits, and said segment buffer array for controlling data transfer therebetween.

7. The multiple disk drive array as set forth in claim 1 wherein said parity groups are each formed of numbers of disk drives which are small relative to the total number of disk drives in said plurality of disk drives.

8. The multiple disk drive array as set forth in claim 7 wherein said plurality of disk drives numbers between twenty and one hundred and wherein each of said parity groups includes between five and ten disk drives.

9. The multiple disk drive array as set forth in claim 1 wherein each of said parity groups includes six disk drives.

10. The multiple disk drive array as set forth in claim 1 wherein each of said parity groups includes five disk drives.

11. The multiple disk drive array as set forth in claim 1 wherein each of said parity groups includes between five and ten disk drives.

12. The multiple disk drive array as set forth in claim 1 wherein said plurality of disk drives is between twenty and one hundred.

13. The multiple disk drive array as set forth in claim 1 wherein said plurality of disk drives numbers between twenty and one hundred and wherein each of said parity groups includes between five and ten disk drives.

14. The multiple disk drive array as set forth in claim 1 wherein said error correction means further generates parity data for storage on each of said parity drives.

15. The multiple disk drive array as set forth in claim 1 wherein each of said parity groups has at least one active disk drive in addition to the disk drive designated as the parity drive; and said controller means communicates data to and/or from said disk drives within each of said parity groups in a substantially uniform distribution among the active disk drives of the parity group.

16. A multiple disk drive array for use in storing and/or retrieving data within a multi-user video server, the multiple disk drive array comprising:

a plurality of communication busses;

a plurality of disk drive groups, each of said disk drive groups having at least one disk drive coupled to one of said communication busses;

a plurality of disk controllers, each coupled to one of said communication busses, for storing data on and/or retrieving data from said disk drives of a respective disk drive group in a substantially uniform distribution; and error correction means for treating the disk drives as parity groups, each of said parity groups having a parity drive and at least one active disk drive.

17. The multiple disk drive array as set forth in claim 16 wherein each of said parity groups includes disk drives selected from at least two different ones of said plurality of disk drive groups.

18. The multiple disk drive array as set forth in claim 17 wherein said parity groups include a disk drive from each of said disk drive groups.

19. The multiple disk drive array as set forth in claim 16 wherein each of said parity groups is formed of disk drives coupled to a common one of said communication busses.

20. The multiple disk drive array as set forth in claim 19 wherein the number of said parity groups in said plurality of parity groups is substantially equal to the number of said communication busses.

21. The multiple disk drive array as set forth in claim 16 wherein the number of said parity groups in said plurality of parity groups is substantially equal to the number of said communication busses.

22. The multiple disk drive array as set forth in claim 21 wherein the number of disk drives in said parity groups is small relative to the total number of disk drives in said plurality of disk drive groups.

23. The multiple disk drive array as set forth in claim 16 wherein the number of disk drives in said parity groups is small relative to the total number of disk drives in said plurality of disk drive groups.

24. A multiple disk drive array for use in storing and retrieving data within a multi-user video server system, the multiple disk drive array comprising a plurality of disk drives organized into a plurality of parity groups having data substantially uniformly distributed among said parity groups, each parity group having plural active drives and a designated parity drive and each parity group having its respective data stored in a substantially uniform distribution among its active disk drives, the number of said parity groups being about the same as or larger than the number of disk drives in each of said parity groups.

25. A multiple disk drive array for use in storing and retrieving data within a multi-user information system accessible to a plurality of users (Nv), the multiple disk drive array comprising a plurality of disk drives, each disk drive having a minimum data location time interval (Td), organized into a plurality of parity groups (G), each parity group having a designated parity drive, said number of parity groups being selected to provide a system response time for user access (Tserv) in accordance with the following:

$$Tserv = (Nv \times Td)/G.$$

* * * * *